(12) United States Patent      (10) Patent No.:    US 12,571,874 B2
Salam et al.                       (45) Date of Patent:      Mar. 10, 2026

(54) MODELING OF MULTI-PATH REFLECTION FOR GENERATING WIRELESS CONNECTIVITY HEATMAPS FOR PHYSICAL ENVIRONMENTS

(71) Applicant: Cisco Technology, Inc., San Jose, CA (US)

(72) Inventors: Samer M Salam, Beirut (LB); Matt Silverman, Shaker Heights, OH (US); Taha Hajar, Chavannes-Renens (CH); Salvatore Valenza, Pomy (CH); Evgeny Yankevich, Beachwood, OH (US)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 18/300,247

(22) Filed: Apr. 13, 2023

(65) Prior Publication Data

US 2024/0345200 A1      Oct. 17, 2024

(51) Int. Cl.
*H04W 16/18*      (2009.01)
*G01S 5/02*      (2010.01)
*H04B 17/327*      (2015.01)

(52) U.S. Cl.
CPC ........ *G01S 5/02528* (2020.05); *H04B 17/327* (2015.01); *H04W 16/18* (2013.01)

(58) Field of Classification Search
CPC .............. G01S 5/02528; H04B 17/327; H04B 17/3912; H04B 17/318; H04W 16/18
See application file for complete search history.

(56) References Cited

U.S. PATENT DOCUMENTS

2022/0319073 A1 * 10/2022  Balaraman ............ G06T 11/206
2023/0021720 A1 *  1/2023  Ferrari ................. H04B 17/318
2025/0071040 A1 *  2/2025  Wang ..................... G16Y 40/50

FOREIGN PATENT DOCUMENTS

EP          2936865 B1 *  2/2019  ........... H04B 17/104

OTHER PUBLICATIONS

International Search Report and Written Opinion; PCT Application No. PCT/US24/21524, dated Jul. 2, 2024, 12 pages.

* cited by examiner

*Primary Examiner* — Lakeram Jangbahadur
(74) *Attorney, Agent, or Firm* — Polsinelli P.C.

(57)      ABSTRACT

A method includes determining a 2D DEM for a physical environment, determining a viewshed for an access point in the physical environment using the DEM, and identifying, at the end terminal, at least one obstacle that is visible from the access point. For each point in space within the physical environment that is on a same side of the at least one obstacle as the access point: a respective first RSSI is determined, the respective first RSSI being associated with a direct LOS ray from the access point to a point in the space. A respective second RSSI for each of the at least one obstacle is determined to yield at least one second RSSI. A respective RF power based on the respective first RSSI and the at least one second RSSI is also determined, the respective RF power being used for generating a 3D heatmap for the physical environment.

17 Claims, 10 Drawing Sheets

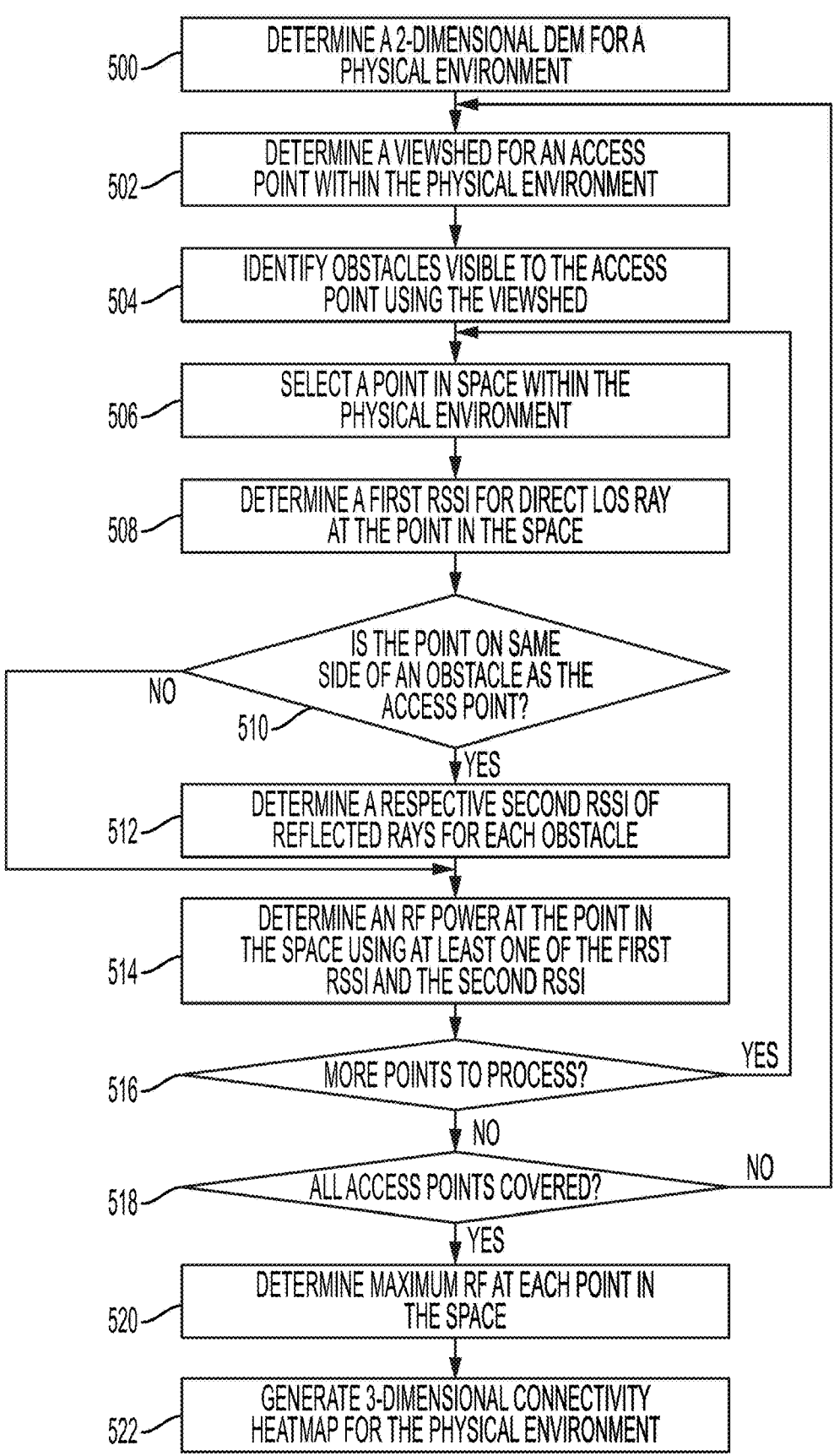

500 — DETERMINE A 2-DIMENSIONAL DEM FOR A PHYSICAL ENVIRONMENT

502 — DETERMINE A VIEWSHED FOR AN ACCESS POINT WITHIN THE PHYSICAL ENVIRONMENT

504 — IDENTIFY OBSTACLES VISIBLE TO THE ACCESS POINT USING THE VIEWSHED

506 — SELECT A POINT IN SPACE WITHIN THE PHYSICAL ENVIRONMENT

508 — DETERMINE A FIRST RSSI FOR DIRECT LOS RAY AT THE POINT IN THE SPACE

510 — IS THE POINT ON SAME SIDE OF AN OBSTACLE AS THE ACCESS POINT? — NO / YES

512 — DETERMINE A RESPECTIVE SECOND RSSI OF REFLECTED RAYS FOR EACH OBSTACLE

514 — DETERMINE AN RF POWER AT THE POINT IN THE SPACE USING AT LEAST ONE OF THE FIRST RSSI AND THE SECOND RSSI

516 — MORE POINTS TO PROCESS? — YES / NO

518 — ALL ACCESS POINTS COVERED? — NO / YES

520 — DETERMINE MAXIMUM RF AT EACH POINT IN THE SPACE

522 — GENERATE 3-DIMENSIONAL CONNECTIVITY HEATMAP FOR THE PHYSICAL ENVIRONMENT

FIG. 5

MODELING OF MULTI-PATH REFLECTION FOR GENERATING WIRELESS CONNECTIVITY HEATMAPS FOR PHYSICAL ENVIRONMENTS

FIELD OF THE TECHNOLOGY

The subject matter of this disclosure generally relates to the field of computer network, and particularly to efficient modeling of multi-path reflection to be used in generating predictive wireless heatmaps for a given physical environment.

BACKGROUND

Heatmaps are often generated to determining how best to deploy a network within a given geographical location. In particular, multi-path models that incorporate the effect of reflection of Radio Frequency (RF) energy off surfaces help address heatmap anomalies related to excessive shadowing that is prominent behind beams and other small obstacles. The biggest technical challenge with these multi-path models is that they are computationally intensive which hinders their implementation on network controller platforms without relying on cloud-based compute offload.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example process for generating heatmap for a physical location according to some aspects of the present disclosure;

DETAILED DESCRIPTION

Figure 1A:
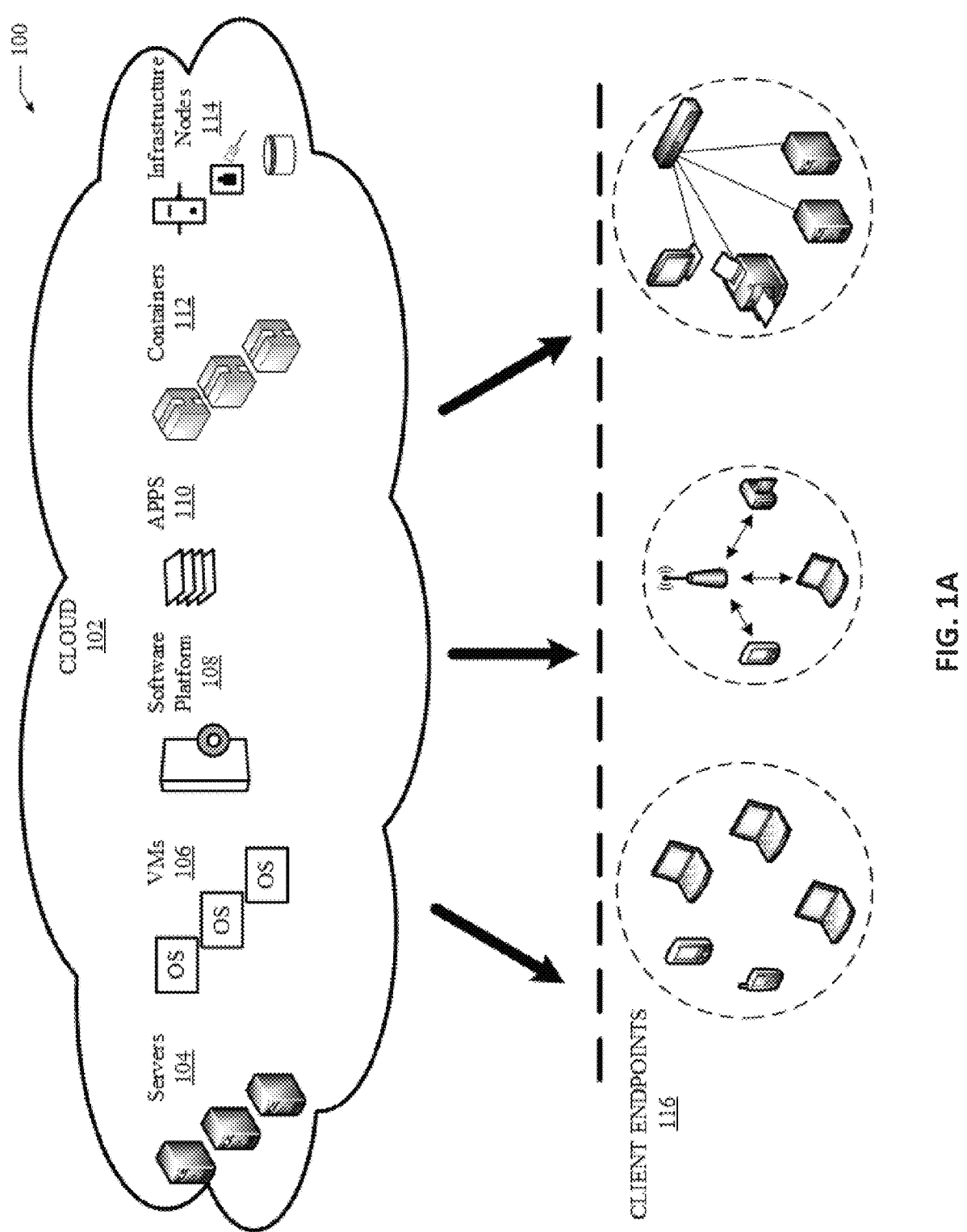
FIG. 1A illustrates an example cloud computing architecture according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The proposed solution here is a highly efficient method and apparatus for modeling RF reflection that leverages the GPU capabilities of modern laptop/desktop computers, thereby allowing controller platforms to implement those models in the web browser used to access the controller's user interface. Thus, the proposed solution addresses the computationally intensive aspect of existing solutions by enabling the entire process to be performed on an end terminal instead of a centralized/cloud-based network component.

In one aspect, a method includes determining, at an end terminal, a 2-dimensional Digital Elevation Model (DEM) for a physical environment, determining, at the end terminal, a viewshed for an access point in the physical environment using the 2-dimensional DEM, and identifying, at the end terminal, at least one obstacle that is visible from the access point. The method further includes, for each point in space within the physical environment that is on a same side of the at least one obstacle as the access point: determining a respective first Received Signal Strength Indicator (RSSI), the respective first RSSI being associated with a direct Line of Sight (LOS) ray from the access point to a corresponding point in the space, determining a respective second RSSI for each of the at least one obstacle to yield at least one second RSSI, and determining a respective Radio Frequency (RF) power based on the respective first RSSI and the at least one second RSSI, wherein the respective RF power is further processed for generating a 3-dimensional (3D) connectivity heatmap for the physical environment.

In another aspect, the method further includes iterating determination of the plurality of RF powers for each of a plurality of access points to yield a plurality of RF powers for each point in the space, determining a respective maximum RF power for each point in the space from among the plurality of RF powers, and generating the 3-D heatmap using the respective maximum RF power for all points in the space.

In another aspect, the obstacles are identified using a viewshed computation algorithm.

In another aspect, the respective first RSSI is determined based on a transmission power of the access point, a gain of an antenna of the access point and a path loss associated with a path between the access point and a corresponding point in the space.

In another aspect, determining the respective second RSSI includes determining a reflection point on a respective plane of the at least one obstacle, the reflection point being within bounds of a respective one of the at least one obstacle, determining that there is a direct LOS from the access point to the reflection point and from the reflection point to a corresponding point in the space, and determining the respective second RSSI based on the reflection point.

In another aspect, the respective second RSSI is determined based on a transmission power of the access point, a gain of an antenna of the access point, a reflection loss for each of the at least one obstacle, and a corresponding path loss associated with a path between the access point, the reflection point, and the corresponding point in the space.

In another aspect, the DEM is determined using a central processing unit of the end terminal and the viewshed, identification of the at least one obstacle, determination of the respective first RSSI, the at least one second RSSI, the respective RF power, and generation of the 3-D connectivity heatmap are performed using a Graphics Processing Unit of the end terminal.

In one aspect, a device includes one or more memories having computer-readable instructions stored therein, and one or more processors, The one or more processors are configured to execute the computer-readable instructions to determine a 2-dimensional Digital Elevation Model (DEM) for a physical environment, determine a viewshed for an access point in the physical environment using the 2-dimensional DEM, and identify at least one obstacle that is visible from the access point. For each point in space within the physical environment that is on a same side of the at least one obstacle as the access point, the device is configured to determine a respective first Received Signal Strength Indicator (RSSI), the respective first RSSI being associated with a direct Line of Sight (LOS) ray from the access point to a corresponding point in the space, determine a respective second RSSI for each of the at least one obstacle to yield at least one second RSSI, and determine a respective Radio Frequency (RF) power based on the respective first RSSI and the at least one second RSSI, wherein the respective RF power is further processed for generating a 3-dimensional (3D) connectivity heatmap for the physical environment.

In one aspect, one or more non-transitory computer-readable media include computer-readable instructions, which when executed by one or more processors of an end terminal, cause the end terminal to determine a 2-dimensional Digital Elevation Model (DEM) for a physical environment, determine a viewshed for an access point in the physical environment using the 2-dimensional DEM, and identify at least one obstacle that is visible from the access point. For each point in space within the physical environment that is on a same side of the at least one obstacle as the access point, a respective first Received Signal Strength Indicator (RSSI) is determined, the respective first RSSI being associated with a direct Line of Sight (LOS) ray from the access point to a corresponding point in the space. A respective second RSSI for each of the at least one obstacle is also determined to yield at least one second RSSI. Furthermore, a respective Radio Frequency (RF) power based on the respective first RSSI and the at least one second RSSI is determined, wherein the respective RF power is further processed for generating a 3-dimensional (3D) connectivity heatmap for the physical environment.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Wireless heatmaps will allow a network controller the ability to quickly and easily survey the coverage area of access points (APs) in a wireless network and implement a wireless network implementation in a geographical area using the wireless heatmap, all from a web browser used to access the heatmap. The heatmaps visually represent the signal strength across the network, allowing the ability to identify weak spots and identify corrective actions. Oftentimes heatmaps are fully customizable, allowing for flexibility in creating or recreating unique networks and further help to make decisions in order to improve the coverage of the wireless network.

Heatmaps can be used to monitor the performance of devices and APs on a network and identify any sources of interference. Additionally, they provide an easy way to plan for future expansion or upgrades. Using the information from the APs along with a map of the physical location, a variety of hot and cold spots can be found that represent the strength of the transmission of a signal from the APs.

The disclosed technology addresses the need in the art for modeling the heatmaps beyond direct line of sight (LOS) propagation and obstacle attenuation. In particular, multi-path models that incorporate the effect of reflection of RF energy off surfaces help address heatmap anomalies related to excessive shadowing that is prominent behind beams and other small obstacles. Often multi-path models are computationally intensive, hindering their implementation on network controller platforms without relying on cloud-based compute offload. As such, these approaches either perform brute-force analysis of the entire geometries in the space, or perform a search of possible reflection surfaces on a per target vertex (e.g., client position) basis. This requires significant computing resources and requires hours of runtime.

Accordingly, this disclosure provides a highly efficient method and apparatus for modeling RF reflection that leverages the GPU capabilities of modern laptop/desktop computers, thereby allowing our controller platforms (e.g. DNA Center) to implement those models in the web browser used to access the controller's user interface.

Figure 1B:
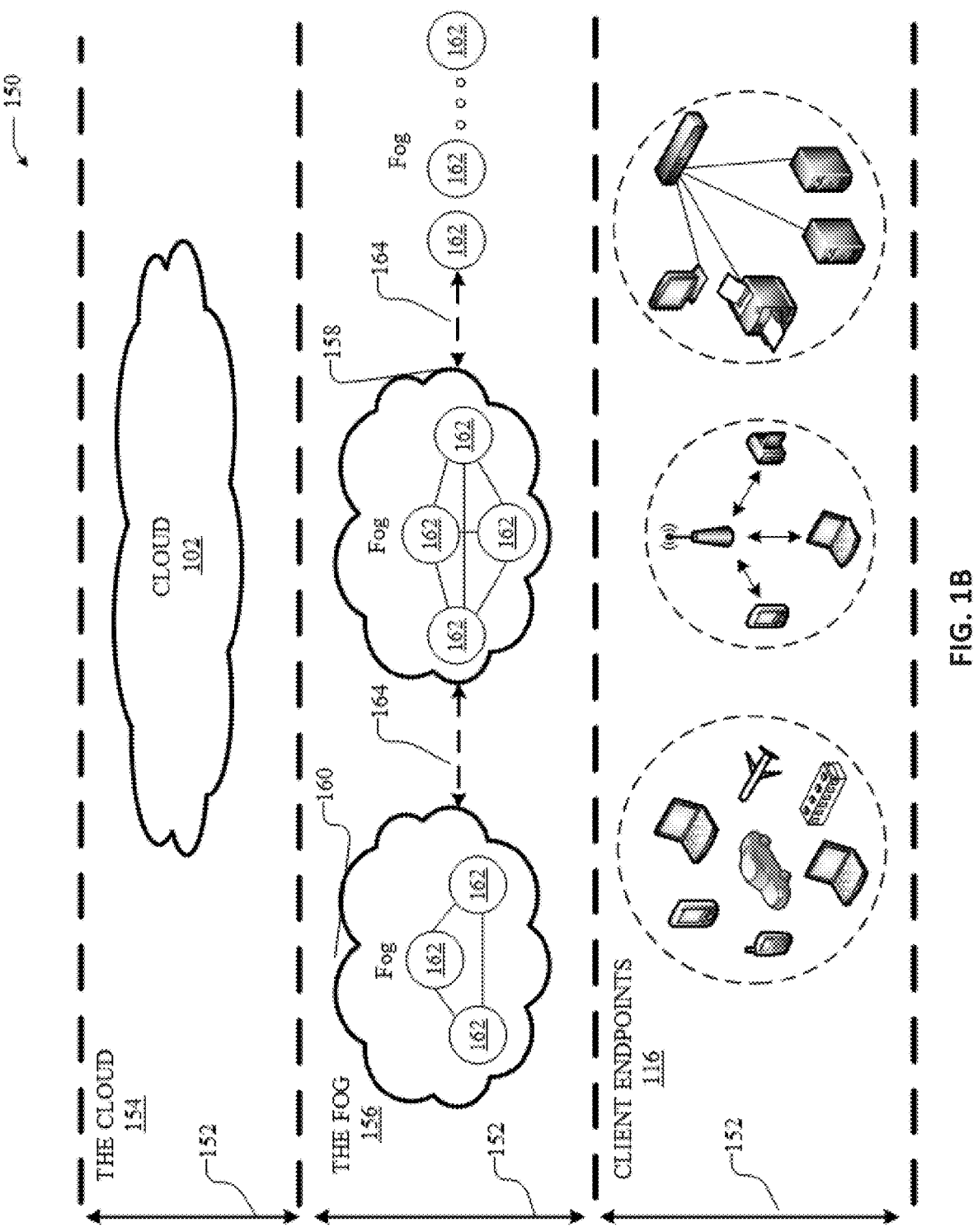
FIG. 1B illustrates an example fog computing architecture according to some aspects of the present disclosure.

Prior to describing the proposed techniques and methods, example network environments and architectures for network data access and services, as illustrated in FIG. 1A, and FIG. 1B. The efficient RF modeling disclosed herein, can be used for implementation of edge devices and components of example networks of FIGS. 1A and 1B in any given geographical location.

FIG. 1A illustrates a diagram of an example cloud computing architecture according to some aspects of the present disclosure. The architecture 100 can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture according to some aspects of the present disclosure. The fog computing architecture 150 can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The fog computing architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node can connect to a particular physical and/or logical connection point with the cloud layer 154 while located at the starting location and switch to a different physical and/or logical connection point with the cloud layer 154 while located at the destination location. The particular fog node can thus move within particular clouds and/or fog instances and, therefore, serve endpoints from different locations at different times.

Figure 2:
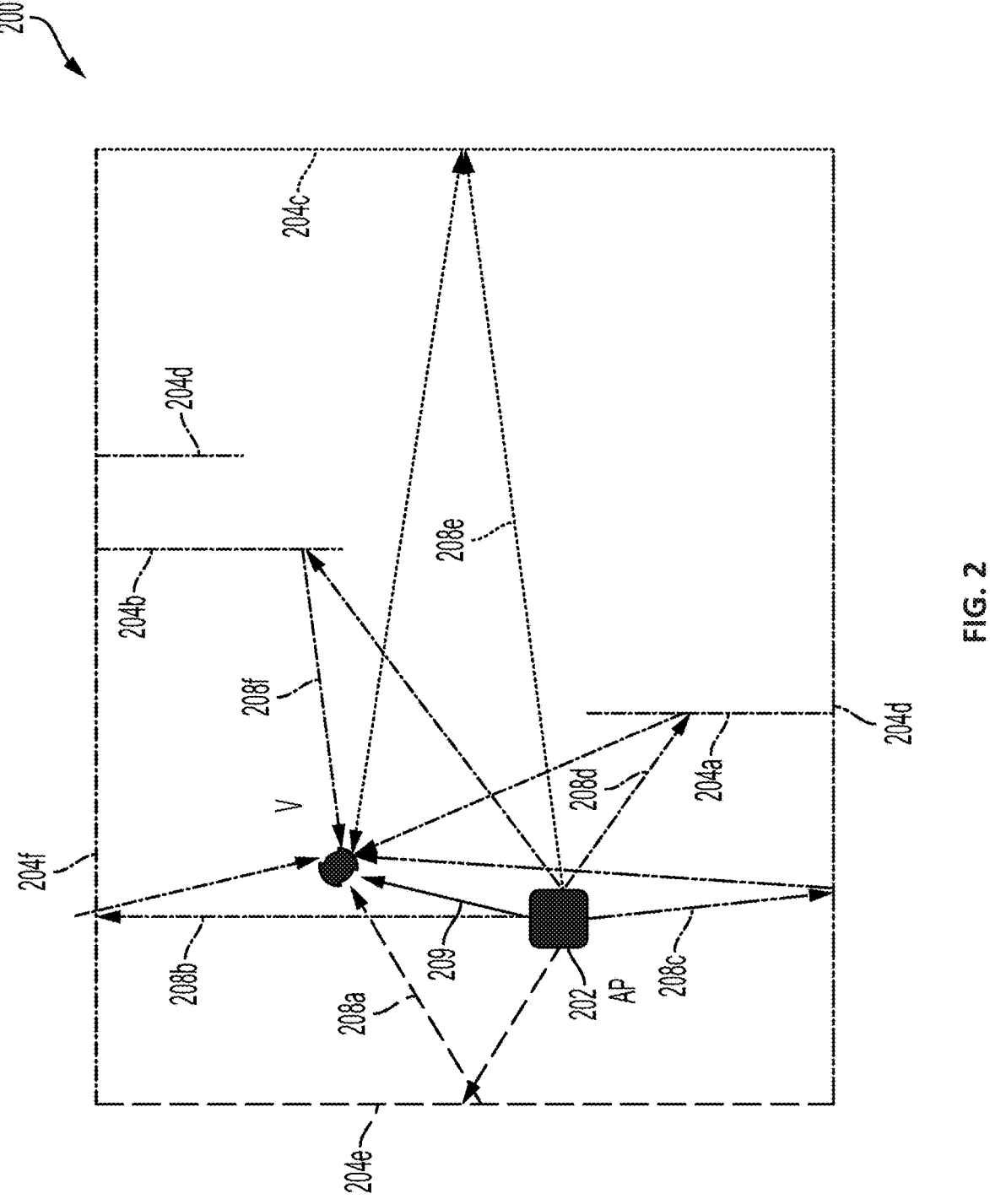
FIG. 2 illustrates an example of multi-ray reflection off of obstacles in a geographical location according to some aspects of the present disclosure.

FIG. 2 illustrates an example of multi-ray reflection off of obstacles in a geographical location according to some aspects of the present disclosure. As illustrated in FIG. 2, a physical location 200 may include at least one AP 202, and a plurality of obstacles 204a-f. The obstacles 204a-f can include a plurality of wall structures or other physical structures that may be present within the physical location 200. The AP 202 can be any type of known and/or to be developed access point that can provide network connectivity to one or more devices connected thereto to connect to a network such as those described above with reference to FIGS. 1A and 1B.

In the physical location 200 of FIG. 2, the AP 202 may transmit a plurality of wireless signals 208a-f throughout the physical location (physical environment) 200, representing a wireless network coverage area. As the wireless signals 208a-f are transmitted, a plurality of devices and user equipment can receive varying levels of signal strength from the AP 202 based on their location within the physical location 200. In some examples, each of the plurality of wireless signals 208a-f emitted from the AP 202 can encounter one or more obstacles 204a-f in the physical location 200, resulting in varying signal interruptions or signaling losses. Upon encountering one or more obstacles 204a-f in the physical location 200, the wireless signals can experience a reflective property, causing the wireless signal to reflect off the obstacles 204a-f. As shown in FIG. 2, any point in space within location 200 may be identified as a vertex. For purposes of generating a wireless heatmap of the present disclosure, a vertex may refer to any point in the location 200 that receives a primary RF ray within a line-of-sight from the AP 202 (direct RF ray 209) and at least one first-order reflected ray for one or more of the obstacles 204-a-f that are visible from the AP 202 (e.g., wall 204a, wall 204b, wall 204c, wall 204c, and wall 204f) in this example.

The reflection of the rays can be modeled by first computing a DEM of the floorplan of the physical location 200, where the APs such as the AP 202 are installed. The DEM may be a 2-dimensional pixelized map of the physical location 200 and may be generated according to any known or to be developed method and process for generating DEMs. As will be described in greater detail below, the DEM may be utilized to determine a viewshed for each AP located in the physical location 200 (or candidate locations within the physical location 200 for installing APs). A viewshed may comprise cells (pixels) from the DEM that are in Line of Sign (LOS) of a given AP and can be used to determine obstacles that are visible to a given AP such as the AP 202. The DEM may be generated using a Central Processing Unit (CPU) of an end terminal via which a controller of an enterprise network is accessed and access points can be managed. As will be described below, the disclosed process for generating a 3-D heatmap of wireless coverage for the physical location 200, including DEM generation, is simplified such that the underlying computations can be implemented using processing capabilities of the end terminal without having to rely on/access cloud-based resources.

Figure 3:
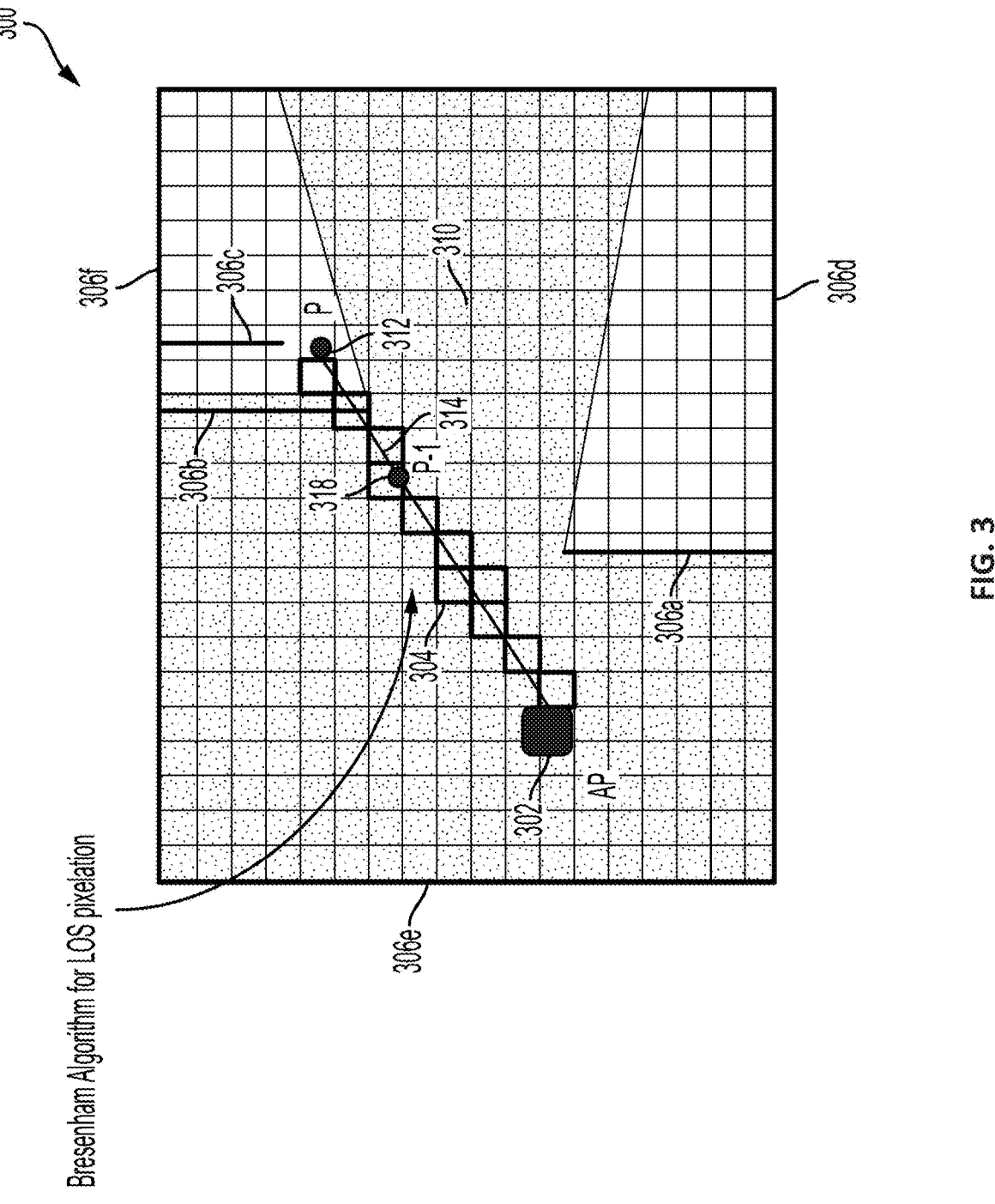
FIG. 3 illustrates an example of a DEM for a physical environment according to some aspects of the present disclosure.

FIG. 3 illustrates an example of a DEM for a physical environment according to some aspects of the present disclosure. As discussed above with reference to FIG. 2, DEM 300 can be generated for the purpose of determining the viewshed of every such as the AP 302 in a physical location such as the physical location 200. A viewshed 310 is used to identify one or more of obstacles 306a-f that are visible to the AP 302. Determining the viewshed from the AP 302, a subset of the obstacles 306a-f can be identified that is visible from the position of the AP 302.

In some examples, an R3 viewshed algorithm (a viewshed computation algorithm) can be implemented, using the GPU of an end terminal (computing device) to determine/identify obstacles that are visible to the AP 302. While R3 viewshed algorithm is used as an example, the present disclosure is not limited thereto. Any other known and/or to be developed algorithm may be utilized for determining the viewshed of each AP in the physical location 300 such as the AP 302.

As part of determining the viewshed for an AP such as the AP 302, a LOS from the AP 302 to each point (observation point) in the physical location 300 is determined. Bresenham algorithm enables determination of coordinates of each LOS ((x1,y1) coordinates of the AP 302 and (xp,yp) coordinates of the observation point p). These coordinates can be identified using a subset of the DEM cells that corresponding to the LOS. Thereafter, a slope of the line AP,P is determined ($Slope_{AP,P}$), which is then compared to previously calculated slopes for points 1 to p−1 on the line from AP to P. If the $Slope_{AP,i-1} < Slope_{AP,P}$, for i=1 to P−1, then P is determined to be visible to the AP 302 (P is in the viewshed of the AP 302). Repeated for all cells of the DEM, the viewshed 310 can be determined for the AP 302 in physical location 300.

In non-limiting example of FIG. 3, Bresenham algorithm is used to identify a subset of DEM pixels (cells) that are visible from the position of the AP 302 to point P 312. This subset is collectively shown as the cells 304 in FIG. 3. Coordinates of the AP 302 and the P 312 point are determined and based thereon, LOS 314 is identified. For sake of explanation, an assumption is made that the slope of a line between AP 302 and prior point P−1 318 had been determined. Since the slope of line between AP 302 and P−1 318 is not less than the slope of the line between the AP 302 and the P 312 (the two slopes are the same because P−1 318 is on the same line 314 as the line between AP 302 and the P 31), P 312 is determined to not be in the viewshed 310 of the AP 302. This process is repeated for all points and cells in the DEM to identify and generate the viewshed 310.

Thereafter, one or more obstacles that fall within the viewshed 310 are determined to be visible obstacles to the AP 302. In example of FIG. 3, these obstacles would be 306a and 306b while 306c is not because it is outside the viewshed 310. In one or more examples, any obstacle partially visible from the AP 302 would be considered a visible obstacle for purposes of RF power determination at a given point in the space.

Every point in space within the physical location 300 may receive a Radio Frequency (RF) ray directly from the AP 302 as well as reflected RF rays from the obstacles present in the physical location 300. However, for a point that is on the same side of the obstacles 306a and 306b as the AP 302, the RF power of any reflected ray off of the non-visible obstacle 306c would be negligible. Hence, obstacle 306c will be ignored in determined the RF power at such point. Accordingly, the computation of the RF power from any AP at any point in the space can be done significantly faster and does not require significant computation capability such that it can be done at the end terminal without resorting to use of remote/cloud-based computation resources.

Figure 4:
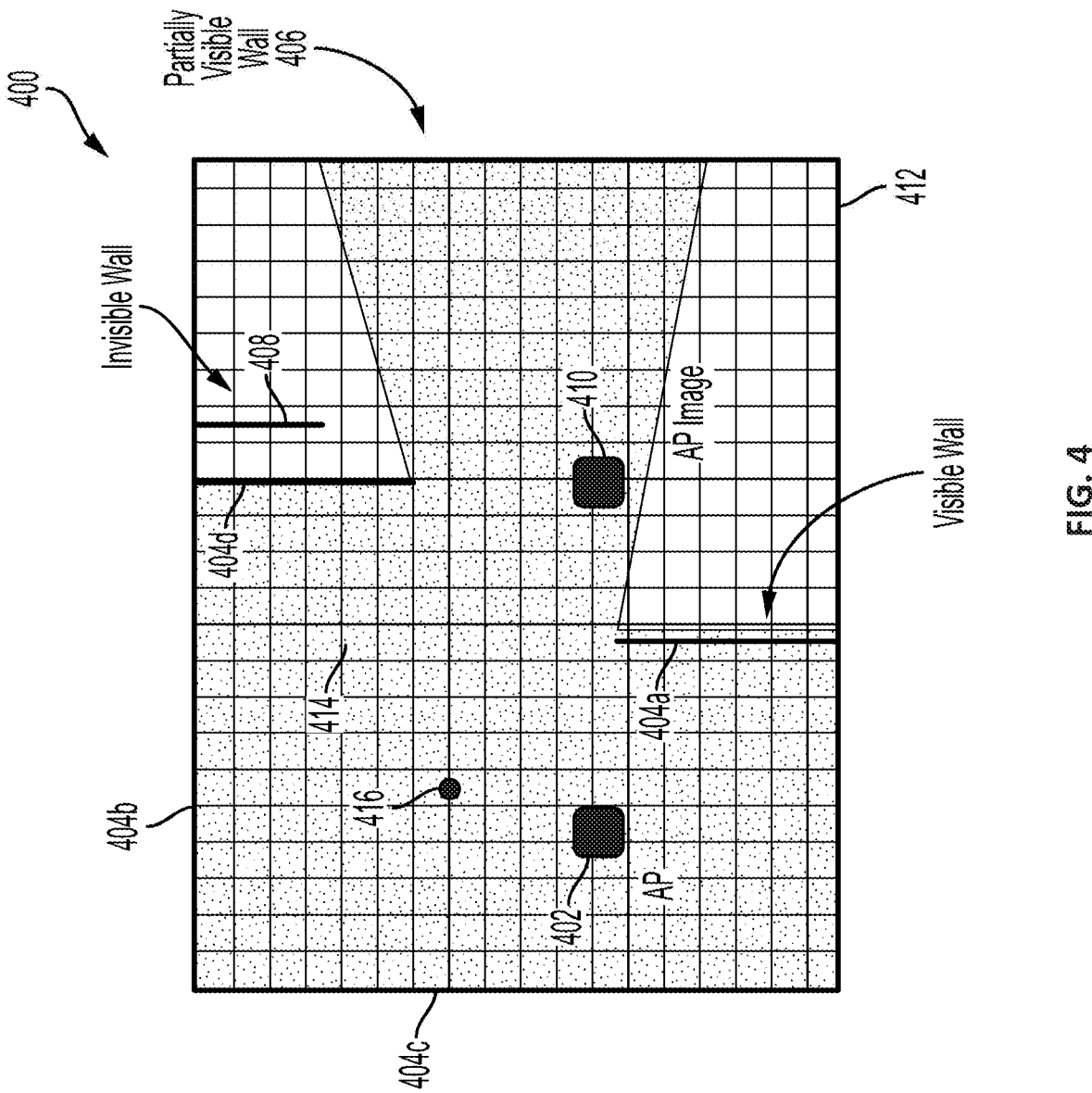
FIG. 4 illustrates an example of visible wall and access point image positioning in a DEM according to some aspects of the present disclosure.

FIG. 4 illustrates an example of visible wall reflection loss and access point image positioning in a DEM according to some aspects of the present disclosure. As shown in FIG. 4, it can be determined that within the viewshed 414 of the AP 402 in the physical location 400, visible obstacles 404a-d as well as partially visible obstacle 406 exist (wall 406) while wall 408 and wall 412 are invisible. Accordingly, in determining RF power of the AP 402 at the point in space P 416, RSSI of the direct RF ray from the AP 402 at the point 416 is determined. Additionally, the RSSI of reflected rays from each of the obstacles 404a-d and 406 are also determined while RSSI of reflected rays from the wall 408 and 412 are ignored (as being negligible). Hence the overall time for determining the RF power at the point 416 is significantly reduced and can be quickly determined for all available and/or candidate APs, allowing for a 3-D heatmap to be generated in a matter of seconds or less. This will be described further below.

In some examples, determination of RSSIs can be based on calculating power attenuation. Power attenuation can be determined as caused by the visible obstacles 404a-d and partially visible obstacles 406 in the physical location 400. Power attenuation caused by the visible obstacles 404a-d and partially visible obstacle 406 in the physical location 400 can represent a decrease in signal strength that occurs when signals are transmitted from the AP 402 to each of the obstacles 404a-d and 406, and from thereon, reflected back to the point 416. This can be due to absorption, reflection, and scattering caused by the obstacles 404a-d and 406. In some examples, the power attenuation, for each obstacle (each of obstacles 404a-c) can be determined by the GPU of a computing device, as follows:

$$\text{Power attenuated by an obstacle} = PowerReflected;$$

$$\text{reflected\_linear} = 1.0 - pow(10.0, wall.loss / 10.0);$$

and $$reflectionLoss = 10.0 * \log(\text{reflected\_linear}) / \log(10.0).$$

In the above calculation, pow represents a value of a base (e.g., 10) raised to a power (e.g., wall loss/10), where wall.loss is the attenuation caused by the material of the corresponding wall measured in dB. Determining the attenuation of the wall may be based on known values for different types of materials (e.g. concrete, drywall, steel, etc.).

In some examples, an AP image for the AP 402 can be determined based on the identified visible (fully or partially) obstacles. An example AP image 410 of AP 402 is shown in FIG. 4. In some examples, the position of the AP image 410 is determined for purposes of determining the reflection point on the obstacle (e.g., the obstacle 404a in FIG. 4).

In one example, an AP image may be determined as follows:

$$vec3 \ normal = cross \ (wall.length, wall.width);$$

$$vec3 \ unitNormal = \text{normalize} \ (vec3 \ normal);$$

$$vec3 \ v = apPosition - wall.p0;$$

$$distance = dot(vec3 \ v, unitNormal);$$

and $$vec3 \ apImage = apPosition - 2.0 * vec3 \ unitNormal * distance.$$

where vec3 is a floating point vector, cross is a cross product of (wall length and wall width), 'apPosition' is the location (e.g., geographical coordinates of the AP 402), wall.p0 is an origin point of an obstacle such as a wall. Each obstacle can be represented by two vectors, an origin point p0 and an orientation vector V. The extremities of the wall are determined as the two points in space corresponding to p0 and p0+V (as a vector sum). Wall.p0 can provide a compact encoding for defining a wall's location in the DEM In some examples, a line may be drawn from the AP image 410 to the point 416 in space. The point where such line intersects a given obstacle can be identified as the reflection point for the RF beam incident from the AP 402 to the wall (e.g., the obstacle 404a). The reflection point, as will be described below, can be used to calculate the attenuation levels for the incident beam and the reflected beam.

FIG. 5 illustrates an example process for generating heatmap for a physical location according to some aspects of the present disclosure. Process of FIG. 5 will be described from the perspective of an end terminal (a computing device) used as a portal for accessing a network controller of an enterprise network for managing access points and wireless coverage in a given physical location. For example, such end terminal can be one of endpoints 116 described with reference to FIGS. 1A and 1B. It should be understood that such endpoint may have one or more processors configured to execute computer-readable instructions stored in an associated memory to implement the steps of FIG. 5, as described below. In describing various steps of FIG. 5, references may be made to one or more of FIGS. 1A-B through FIG. 4.

At step 500, an end terminal may determine a 2-dimensional DEM for a physical environment. The DEM may be determined as described above with reference to FIGS. 2 and 3. An example of a DEM can be the DEM 300 of FIG. 3 for a physical environment such as the physical location 200 of FIG. 2. As noted, the DEM 300 can be determined (generated) according to any known and/or to be developed process.

At step 502, the end terminal, can determine a viewshed for an access point in the physical environment using the DEM determined at step 500. A non-limiting example of the viewshed can be the viewshed 310 and may be determined as described above with reference to FIG. 3 (e.g., using the R3 and Bresenham algorithms). The access point may be the access point 202, 302, and/or 402 (access points 303, 302, and 402 may be the same). In one example, there may be more than one access point in the physical environment. As such and as will be described below, a viewshed may be determined (generated) for each access point or potential access point to be installed within the physical environment.

At step 504, the end terminal can identify obstacles visiting to a given access point using the viewshed determined at step 502. This identification may be performed as described above with reference to FIG. 3.

At step 506, the end terminal may select a point in space within the physical environment. The point can be any one of a set of specific points determined to be of interest/ important for signal reception in the physical environment. In another example, the point can be any one of possible discrete points in the physical environment.

The set of points may be specified manually. In another example, the identification of points of interest can be automatic. For instance, a machine learning model may be trained and utilized to receive as input a given physical environment (and possibly attributes of such environment including, but not limited to, a physical map of the environment, structural characteristics of the environment, architecture and obstacles present in the environment, type of the environment, etc. The trained machine-learning model may then provide as output a set of points of interest at which RF power should be determined for purposes of generating a satisfactory 3-D heatmap for wireless connectivity/reception. A non-limiting example of a point in space can be the point 416 of FIG. 4.

At step 508, the end terminal may determine a first Received Signal Strength Indicator (RSSI) for the point selected at step 506. The first RSSI may be an RSSI of a direct ray from the access point to the selected point (e.g., from the access point 402 directly to the point 416). The RSSI may be determined according to any known or to be developed method and may be based on the transmission power of the access point, a gain of an antenna of the access point, and a path loss associated with a path through which the ray travels directly from the access point to the selected point. In one example, the first RSSI may be determined based on Free Space Path loss, taking into account the attenuation loss caused by passing through any obstacle that happens to be in the direct LOS.

At step 510, the end terminal may determine if the point of interest is on a same side of a given obstacle as the access point. If not (NO at step 508), the end terminal may skip step 512 described below and proceed to step 514. However, if at step 508 the end terminal determines that the point (e.g., the point 416) is on the same side of an obstacle (e.g., the obstacle 404a) as the access point (e.g., the access point 402), then the process proceeds to step 512 (YES at step 508).

At step 512, the end terminal may determine a respective second RSSI for each obstacle that is visible to the access point. The second RSSI being the RSSI of a ray transmitted from the access point to the respective obstacle and then reflected therefrom towards the point in the space.

In one example, and for each second RSSI, the end terminal may determine a reflection point for the corresponding obstacle such that the reflection point lies within a plane of the corresponding obstacle and is within bounds of the respective obstacle.

Figure 6:
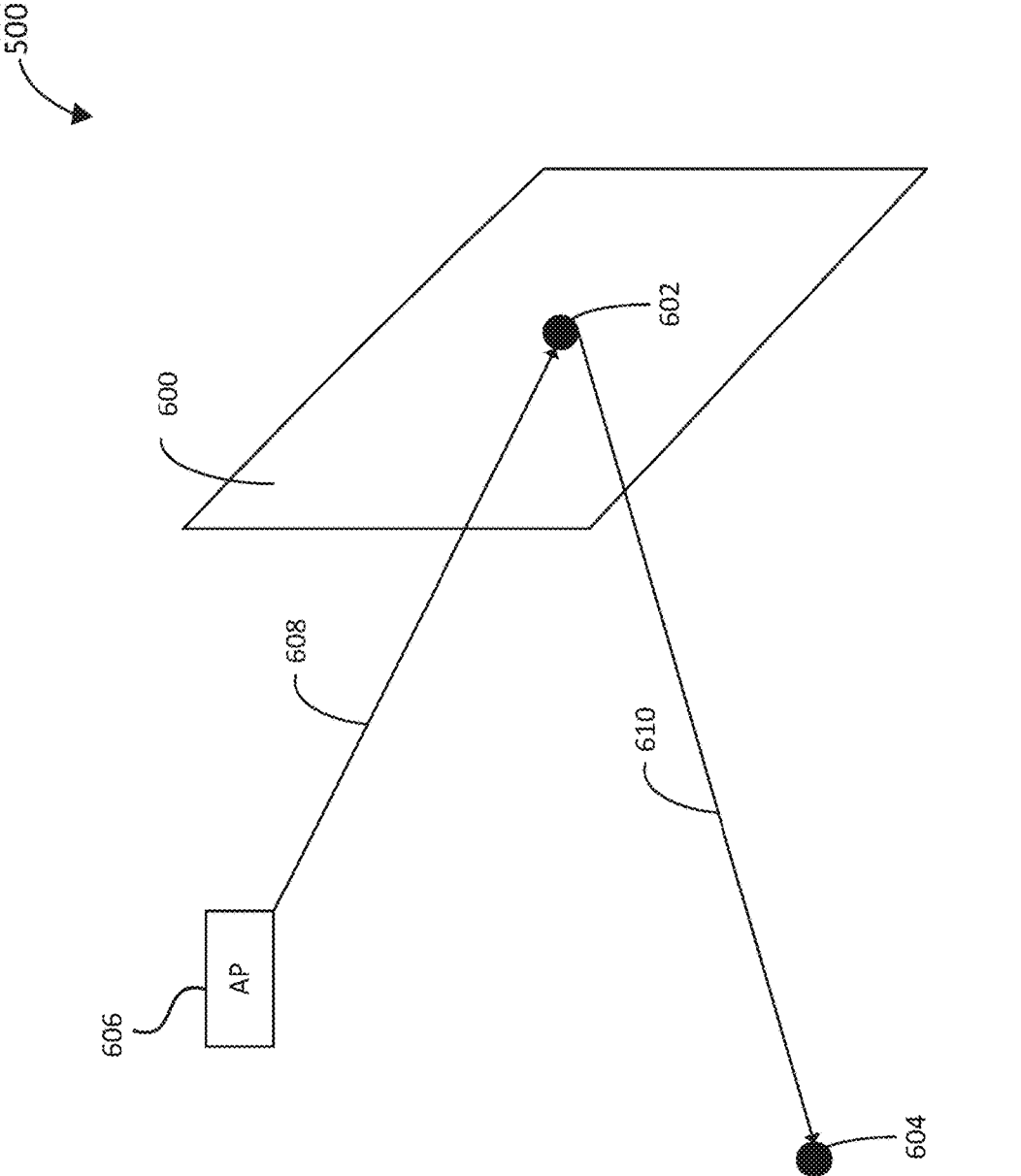
FIG. 6 illustrates an example reflection point for an obstacle according to some aspects of the present disclosure.

FIG. 6 illustrates an example reflection point for an obstacle according to some aspects of the present disclosure. As shown in FIG. 6, plane 600 of an obstacle (e.g., the obstacle 404a). The reflection point 602 in the plane 600 is identified for the point 604 (can be the same as the point 416 of FIG. 4), which is on the same side as the AP 606 (can be the same as the access point 402 of FIG. 4). The incident ray

608 may refer to the transmission of an RF ray/signal from the AP 606 to the reflection point 602 and the reflected ray 610 may refer to the RF ray reflected from the reflection 602 towards the point 604 after the incident ray 608 reaches the reflection point 602.

Upon determining the reflection point, the end terminal may determine the respect second RSSI for the point 604 based on a transmission power of the AP 606, a gain of an antenna of the AP 606, a reflection loss for each of the obstacle (e.g., each of the obstacles 404a-d and 416), and a corresponding path loss associated with a path between the access point, the reflection point, and the point 604.

In one example, the gain of the antenna of the access point 606 may be determined based on an angle of the incident ray 608.

In one example, each second RSSI for a respective visible obstacle may be determined based on the following formula:

$$RSSI = txPower + \text{Antenna Gain} - \text{ReflectionLoss} - \text{Path Loss}_{AP, reflection\ point, point}$$

where txPower is the transmission power of the access point 606, antenna gain is the antenna gain of the access point 606, ReflectionLoss may be determined per the process described above with reference to FIG. 4, and PathLoss may the total path loss between the AP 606, the reflection point 602, and the point 604 and may be determined using Free Space Path Loss model, or an alternative suitable model.

Referring back to FIG. 5, at step 514, the end terminal may determine an RF power at the point in the space using the first RSSI for points that are not on the same side as the corresponding obstacle.

For points that are on the same side as a given obstacle, the end terminal may determine the RF power at the point in the space using the first RSSI and one or more second RSSIs determined for each visible obstacle. In this instance, the RF power may be determined as the sum of the first RSSI and the one or more second RSSIs.

At step 516, the end terminal determines if all points (in the set of points described with reference to step 506) have been analyzed (i.e., if respective first RSSI and second RSSI(s) for each point have been determined). If there are more points to be processed (YES at step 516), the process reverts back to step 506 and steps 506 to 516 are repeated until all points are processed (NO at step 516).

Thereafter, at step 518, the end terminal determines if all access points have been covered (i.e., if the steps 502 to 516 have been carried out for every existing and/or possible future access points installed and/or to be installed within the physical environment). If one or more access points remain to be processed (NO at step 518), the process reverts back to step 502 and steps 502-518 are repeated (iteratively) until all access points are covered (YES at step 518).

Completing the process for all access points results in each point from the set of points having a corresponding total RF power, where each such corresponding total RF power is determined for one of the access points.

At step 520, the end terminal determines a maximum of all the RF powers for any given point in the space and selects the maximum value of all the RF powers as the RF power for that specific point in the space.

At step 522, the end terminal generates a 3-D heatmap for wireless connectivity within the physical environment using the maximum RF value for all the points in the set of points for the physical environment.

In one example, step 500 may be performed on a CPU of the end terminal while the remaining steps of the process of FIG. 5 are performed on one or more GPUs of the end terminal. Relying on processing and computation capacity of the end terminal alone is possible due to the efficient selection of visible obstacles and determining the corresponding RF powers for each point for the visible obstacles only.

Figure 7:
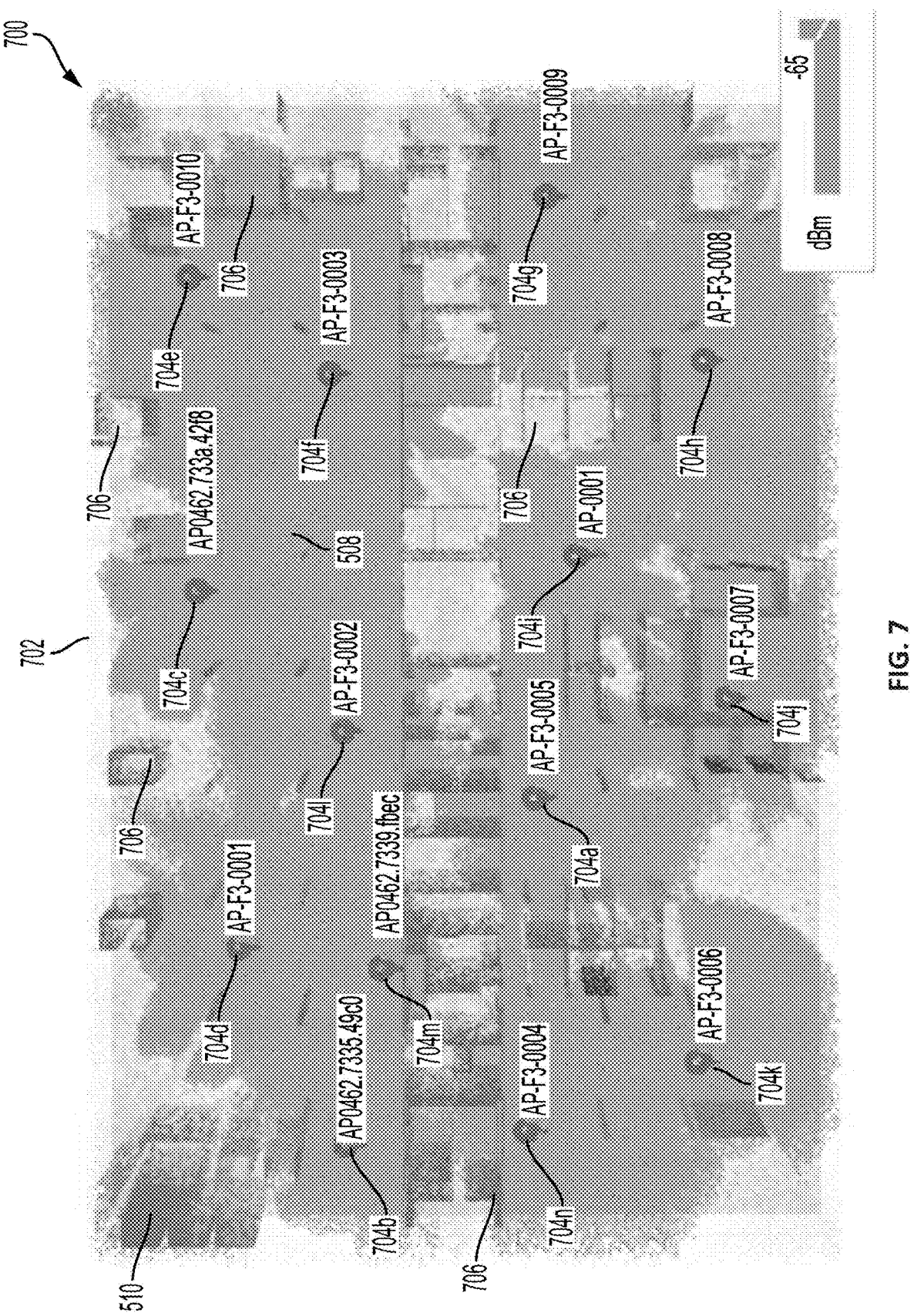
FIG. 7 illustrates an example 3-D heatmap for a physical environment as determined per the process of FIG. 5 according to some aspects of the present disclosure.

FIG. 7 illustrates an example 3-D heatmap for a physical environment as determined per the process of FIG. 5 according to some aspects of the present disclosure.

The heatmap 700 of the physical location 702 (may be the same as the physical location 200) can indicate wireless coverage throughout the physical location 702 covered by one or more APs such as the APs 704a-n (which may be the as any of the APs described above with reference to FIGS. 2-6). The heatmap can be color coded using any standard and/or otherwise determined color coding scheme (e.g., green may be indicative of good coverage, yellow may be indicative of average coverage, and red may be indicative of low coverage. Indications of good, average, and low coverage may be defined using numerical ranges expressed in dB, etc. The heatmap 700 can also depict one or more obstacles 506 present in the physical location 702.

In some examples, as network configuration and parameters are changed, and updated, and the positions of the APs 704a-n are adjusted, the heatmap 700 may be adjusted to further cover the floorplan of the physical location 702, or indicate an increase in a given uncovered area such as the area 710.

Figure 8:
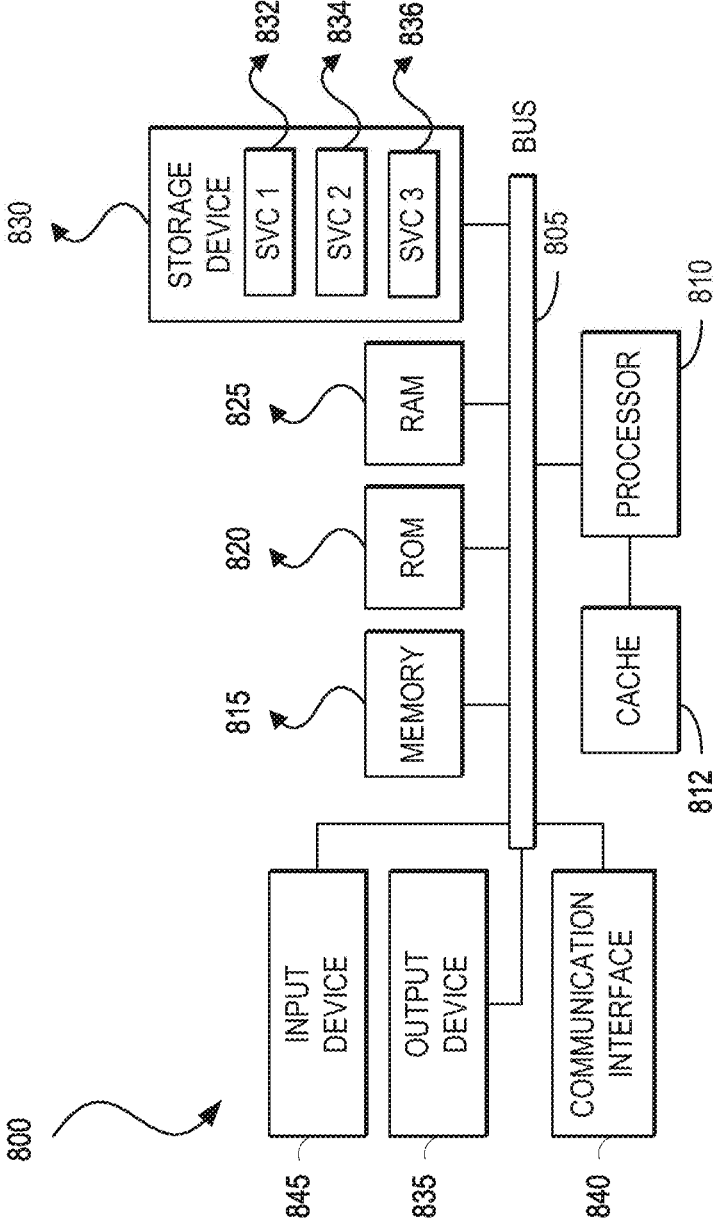
FIG. 8 shows an example of computing system according to some aspects of the present disclosure.

FIG. 8 shows an example of computing system according to some aspects of the present disclosure. Computing system 800 can be for example any computing device making up that can perform functionalities of one or more network components described above (e.g., an end terminal configured to perform the process of FIG. 5, etc.). Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 can essentially be a completely self-contained computing system, containing multiple cores or processors, a bus, memory controller, cache, etc. A multi-core processor can be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here can easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

Figure 9:
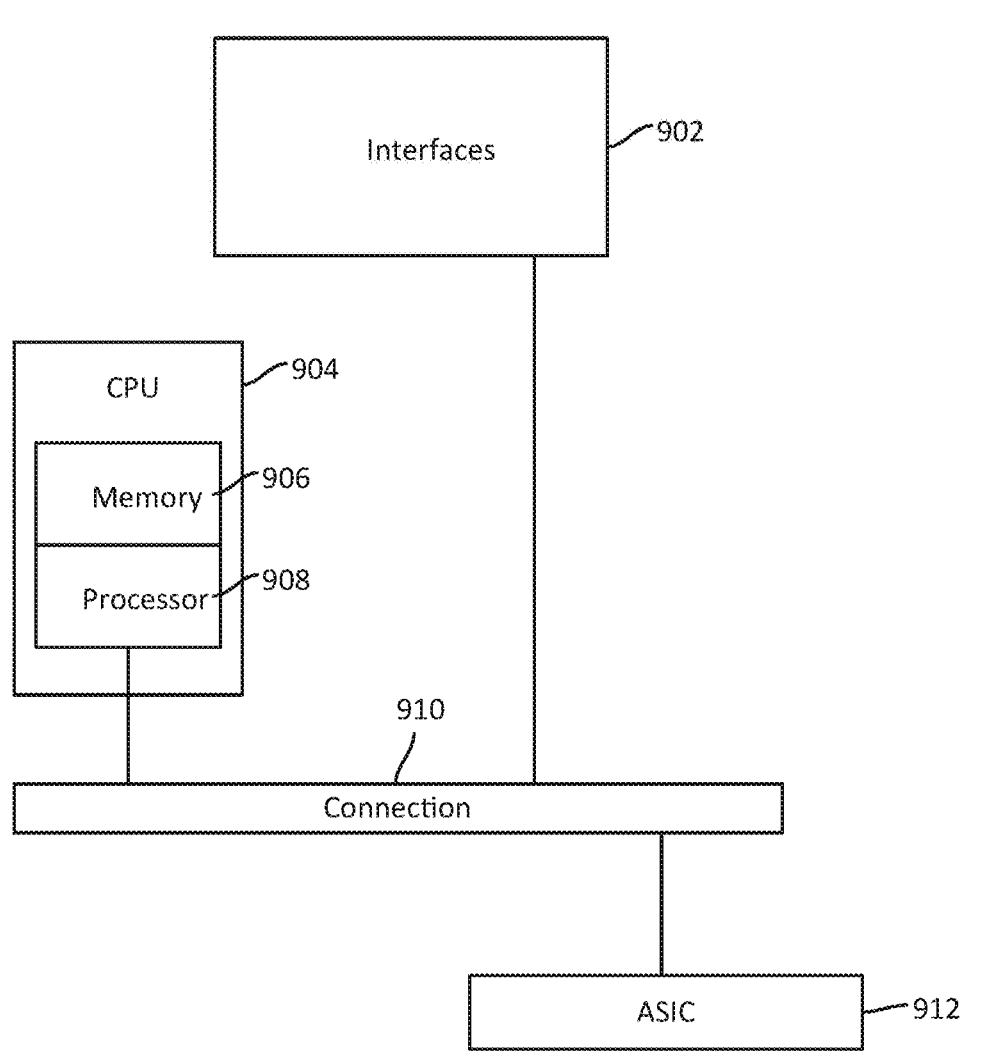
FIG. 9 illustrates an example network device according to some aspects of the present disclosure.

FIG. 9 illustrates an example network device according to some aspects of the present disclosure. Example network device 900 may be suitable for performing switching, routing, load balancing, and other networking operations. The example network device 900 can be implemented as switches, routers, nodes, metadata servers, load balancers, client devices, and so forth.

Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 can include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LORA, and the like. Generally, these interfaces can include ports appropriate for communication with the appropriate media. In some cases, they can also include an independent processor and, in some instances, volatile RAM. The independent processors can control such communications intensive tasks as packet switching, media control, signal processing, crypto processing, and management. By providing separate processors for the communication intensive tasks, these interfaces allow the master CPU (e.g., 904) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 900.

Regardless of the network device's configuration, it can employ one or more memories or memory modules (including memory 906) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc. Memory 906 could also hold various software containers and virtualized execution environments and data.

The network device 900 can also include an application-specific integrated circuit (ASIC) 912, which can be configured to perform routing and/or switching operations. The ASIC 912 can communicate with other components in the network device 900 via the bus 910, to exchange data and signals and coordinate various types of operations by the network device 900, such as routing, switching, and/or data storage operations, for example.

For clarity of explanation, in some instances, the various examples can be presented as individual functional blocks comprising devices, device components, steps or routines in a method embodied in software, or combinations of hardware and software.

In some examples, the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take various form factors. Some examples of such form factors include general-purpose computing devices such as servers, rack mount devices, desktop computers, laptop computers, and so on, or general-purpose mobile computing devices, such as tablet computers, smartphones, personal digital assistants, wearable devices, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:

determining, at an end terminal, a 2-dimensional Digital Elevation Model (DEM) for a physical environment;

determining, at the end terminal, a viewshed for an access point in the physical environment using the 2-dimensional DEM;

identifying, at the end terminal, at least one obstacle that is visible from the access point;

for each point in space within the physical environment that is on a same side of the at least one obstacle as the access point:

determining a respective first Received Signal Strength Indicator (RSSI), the respective first RSSI being associated with a direct Line of Sight (LOS) ray from the access point to a corresponding point in the space, determining a respective second RSSI for each of the at least one obstacle to yield at least one second RSSI, wherein the respective second RSSI is determined based on a transmission power of the access point, a gain of an antenna of the access point, a reflection loss for each of the at least one obstacle, and a corresponding path loss associated with a path between the access point, a reflection point on a respective plane of the at least one obstacle, and the corresponding point in the space; and determining a respective Radio Frequency (RF) power based on the respective first RSSI and the at least one second RSSI, wherein the respective RF power is further processed for generating a 3-dimensional (3D) heatmap for the physical environment.

2. The method of claim 1, further comprising:

iterating determination of the respective RF power for each of a plurality of access points to yield a plurality of RF powers for each point in the space;

determining a respective maximum RF power for each point in the space from among the plurality of RF powers; and generating the 3D heatmap using the respective maximum RF power for all points in the space.

3. The method of claim 1, wherein the obstacles are identified using a viewshed computation algorithm.

4. The method of claim 1, wherein the respective first RSSI is determined based on a transmission power of the access point, a gain of an antenna of the access point and a path loss associated with a path between the access point and a corresponding point in the space.

5. The method of claim 1, wherein determining the respective second RSSI comprises:

determining the reflection point on the respective plane of the at least one obstacle, the reflection point being within bounds of a respective one of the at least one obstacle;

determining that there is a direct LOS from the access point to the reflection point and from the reflection point to a corresponding point in the space; and determining the respective second RSSI based on the reflection point.

6. A device comprising:

one or more memories having computer-readable instructions stored therein; and one or more processors configured to execute the computer-readable instructions to:

determine a 2-dimensional Digital Elevation Model (DEM) for a physical environment;

determine a viewshed for an access point in the physical environment using the 2-dimensional DEM;

identify at least one obstacle that is visible from the access point;

for each point in space within the physical environment that is on a same side of the at least one obstacle as the access point:

determine a respective first Received Signal Strength Indicator (RSSI), the respective first RSSI being associated with a direct Line of Sight (LOS) ray from the access point to a corresponding point in the space, determine a respective second RSSI for each of the at least one obstacle to yield at least one second RSSI, wherein the respective second RSSI is determined based on a transmission power of the access point, a gain of an antenna of the access point, a reflection loss for each of the at least one obstacle, and a corresponding path loss associated with a path between the access point, a reflection point on a respective plane of the at least one obstacle, and the corresponding point in the space; and determine a respective Radio Frequency (RF) power based on the respective first RSSI and the at least one second RSSI, wherein the respective RF power is further processed for generating a 3-dimensional (3D) heatmap for the physical environment.

7. The device of claim 6, wherein the one or more processors are configured to execute the computer-readable instructions to:

iterate determination of the respective RF power for each of a plurality of access points to yield a plurality of RF powers for each point in the space;

determine a respective maximum RF power for each point in the space from among the plurality of RF powers; and generate the 3D heatmap using the respective maximum RF power for all points in the space.

8. The device of claim 6, wherein the obstacles are identified using a viewshed computation algorithm.

9. The device of claim 6, wherein the respective first RSSI is determined based on a transmission power of the access point, a gain of an antenna of the access point and a path loss associated with a path between the access point and a corresponding point in the space.

10. The device of claim 6, wherein the one or more processors are configured to execute the computer-readable instructions to determine the respective second RSSI by:

determining the reflection point on the respective plane of the at least one obstacle, the reflection point being within bounds of a respective one of the at least one obstacle;

determining that there is a direct LOS from the access point to the reflection point and from the reflection point to a corresponding point in the space; and determining the respective second RSSI based on the reflection point.

11. The device of claim 6, wherein the DEM is determined using a central processing unit of the device, and the viewshed, identification of the at least one obstacle, determination of the respective first RSSI, the at least one second RSSI, the respective RF power, and generation of the 3D heatmap are performed using a Graphics Processing Unit of the device.

12. One or more non-transitory computer-readable media comprising computer-readable instructions, which when executed by one or more processors of an end terminal, cause the end terminal to:

determine a 2-dimensional Digital Elevation Model (DEM) for a physical environment;

determine a viewshed for an access point in the physical environment using the 2-dimensional DEM;

identify at least one obstacle that is visible from the access point;

for each point in space within the physical environment that is on a same side of the at least one obstacle as the access point:

determine a respective first Received Signal Strength Indicator (RSSI), the respective first RSSI being associated with a direct Line of Sight (LOS) ray from the access point to a corresponding point in the space, determine a respective second RSSI for each of the at least one obstacle to yield at least one second RSSI, wherein the respective second RSSI is determined based on a transmission power of the access point, a gain of an antenna of the access point, a reflection loss for each of the at least one obstacle, and a corresponding path loss associated with a path between the access point, a reflection point on a respective plane of the at least one obstacle, and the corresponding point in the space; and determine a respective Radio Frequency (RF) power based on the respective first RSSI and the at least one second RSSI, wherein the respective RF power is further processed for generating a 3-dimensional (3D) heatmap for the physical environment.

13. The one or more non-transitory computer-readable media of claim 12, wherein the execution of the computer-readable instructions further cause the end terminal to:

iterate determination of the respective RF power for each of a plurality of access points to yield a plurality of RF powers for each point in the space;

determine a respective maximum RF power for each point in the space from among the plurality of RF powers; and generate the 3D heatmap using the respective maximum RF power for all points in the space.

14. The one or more non-transitory computer-readable media of claim 12, wherein the obstacles are identified using a viewshed computation algorithm.

15. The one or more non-transitory computer-readable media of claim 12, wherein the respective first RSSI is determined based on a transmission power of the access point, a gain of an antenna of the access point and a path loss associated with a path between the access point and a corresponding point in the space.

16. The one or more non-transitory computer-readable media of claim 12, wherein the execution of the computer-readable instructions further cause the end terminal to determine the respective second RSSI by:

determining the reflection point on the respective plane of the at least one obstacle, the reflection point being within bounds of a respective one of the at least one obstacle;

determining that there is a direct LOS from the access point to the reflection point and from the reflection point to a corresponding point in the space; and determining the respective second RSSI based on the reflection point.

17. The one or more non-transitory computer-readable media of claim 12, wherein the DEM is determined using a central processing unit of the end terminal, and the viewshed, identification of the at least one obstacle, determination of the respective first RSSI, the at least one second RSSI, the respective RF power, and generation of the 3D heatmap are performed using a Graphics Processing Unit of the end terminal.

* * * * *